Aug. 31, 1948.  C. W. STORY  2,448,197
TILTABLE TRACK FOR MOTOR VEHICLES OR THE LIKE
Original Filed June 10, 1938  2 Sheets-Sheet 1
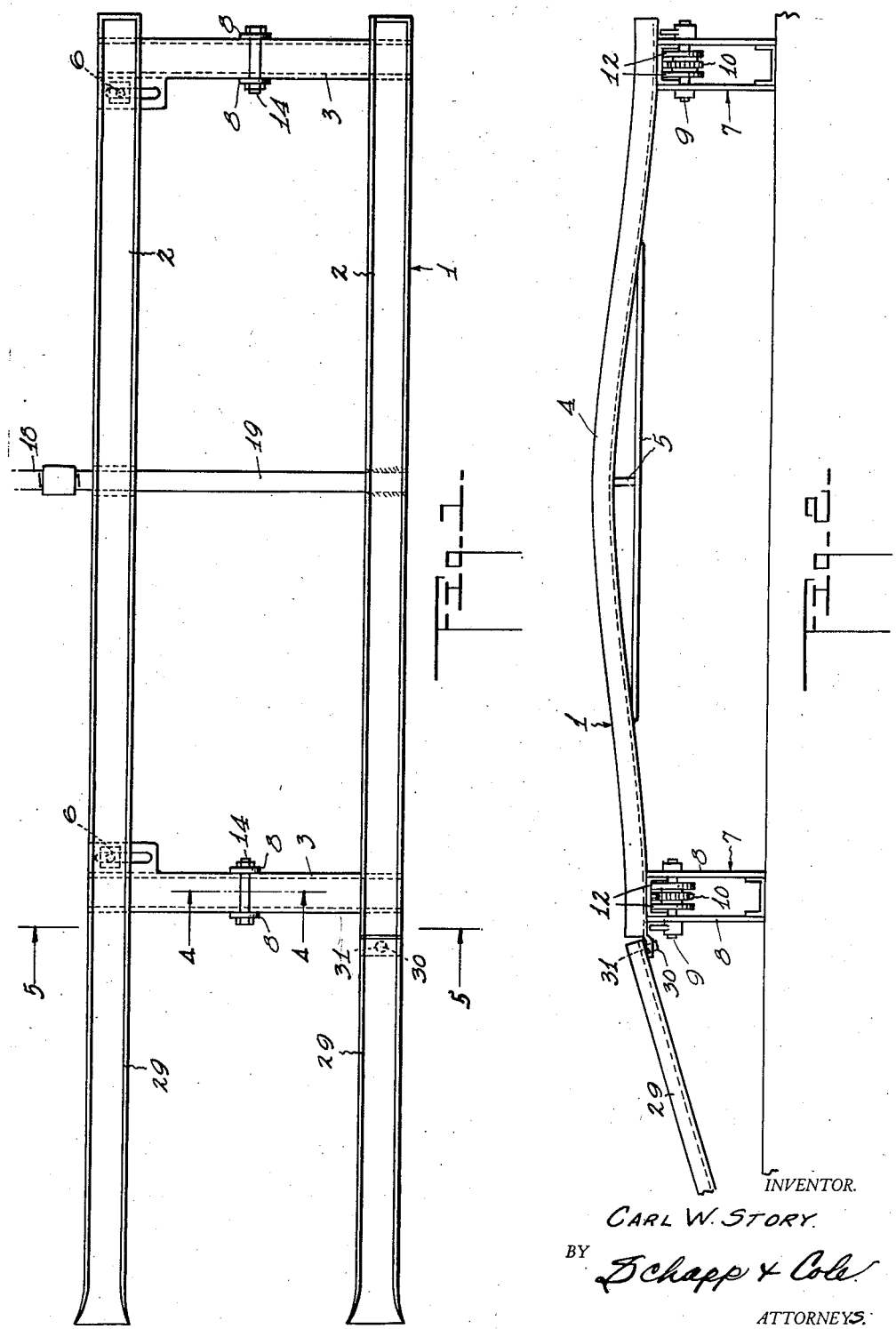
INVENTOR.
CARL W. STORY.
BY Schapp & Cole
ATTORNEYS.

Aug. 31, 1948.   C. W. STORY   2,448,197
TILTABLE TRACK FOR MOTOR VEHICLES OR THE LIKE
Original Filed June 10, 1938   2 Sheets-Sheet 2
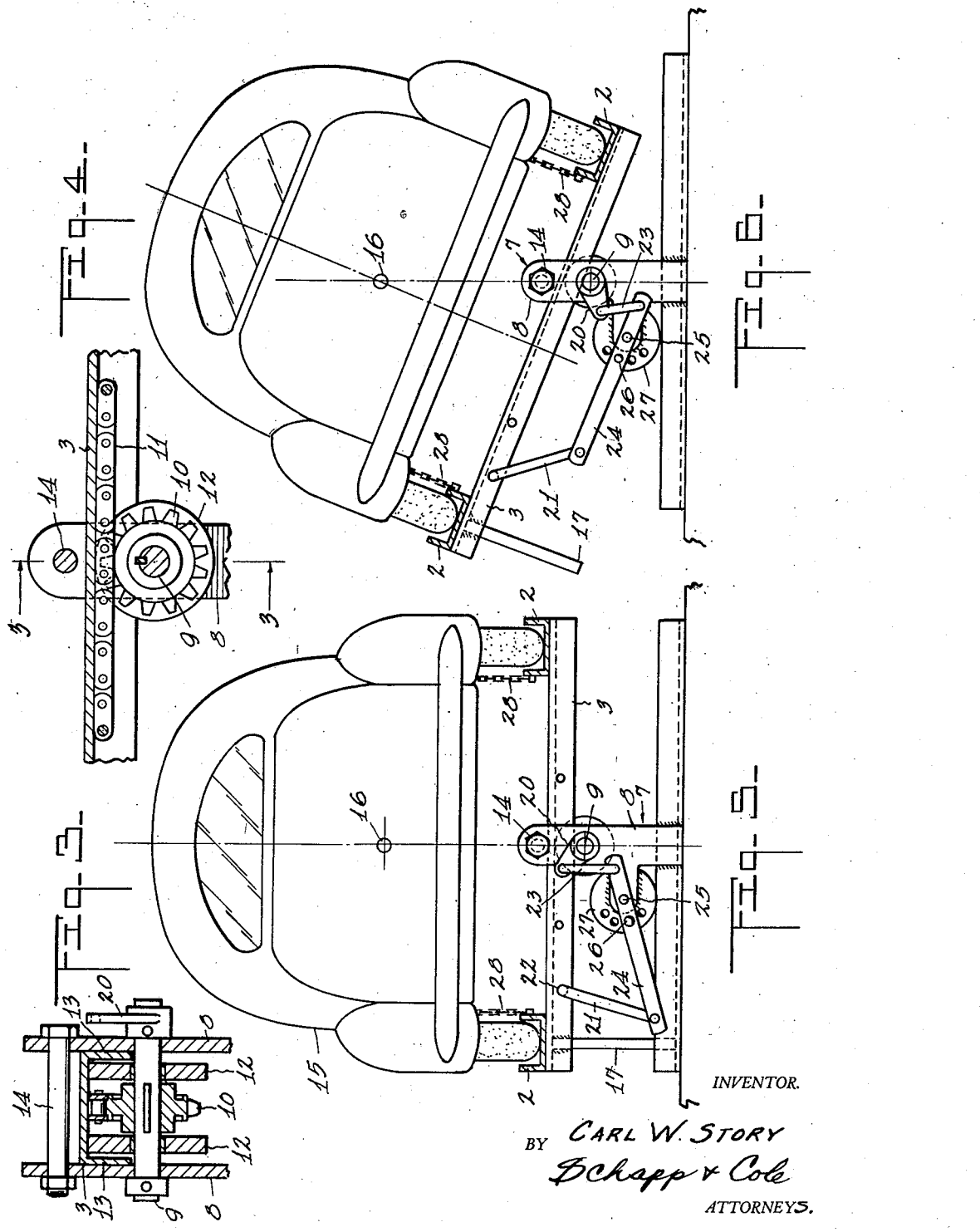
INVENTOR.
BY CARL W. STORY
Schapp & Cole
ATTORNEYS.

Patented Aug. 31, 1948

2,448,197

UNITED STATES PATENT OFFICE 2,448,197

TILTABLE TRACK FOR MOTOR VEHICLES OR THE LIKE

Carl W. Story, San Francisco, Calif.

Substituted for abandoned application Serial No. 212,967, June 10, 1938. This application September 29, 1945, Serial No. 620,054

9 Claims. (Cl. 214—1)

The present invention relates to tiltable tracks for motor vehicles or the like, and its principal object is to provide a track of the character described that is capable of manual operation with a minimum of effort. This application is a substitute for my abandoned application Ser. No. 212,967, filed June 10th, 1938.

A further object of my invention is to provide a tiltable track of the character described in which compensating means are provided to cause the center of gravity of the track load to remain substantially vertically over the axis of the tilting movement during the tilting operation, thus enabling the operator to retain easy control of the tilting movement regardless of the angularity to which the track has been adjusted.

Further objects and advantages of my invention will appear as the specification proceeds, and the novel features of the same will be fully defined in the claims hereto appended.

The preferred form of my invention is illustrated in the accompanying drawing, forming part of this application, in which:

Figure 1 shows a plan view of my tiltable track;

Figure 2, a side elevation thereof;

Figure 3, a fragmentary longitudinal section through the operating mechanism of my tilting track as seen along line 3—3 of Figure 4;

Figure 4, a transverse section through the operating mechanism, taken along line 4—4 of Figure 1;

Figure 5, a transverse vertical section taken along line 5—5 of Figure 1, with a motor vehicle shown in position on the track; and Figure 6, a section similar to that of Figure 5, with the track in tilted position.

While I have shown only the preferred form of my invention, I wish to have it understood that various changes or modifications may be made within the scope of the claims hereto attached, without departing from the spirit of the invention.

In its preferred form my invention comprises a track 1, preferably consisting of a pair of channel-shaped rails 2 arranged in suitable spaced relation on a pair of inverted, channel-shaped cross-members 3. The rails are preferably humped in their central portions, as shown at 4, to prevent a motor vehicle disposed on the track from running off by gravity. Suitable bracing members 5 may be provided to strengthen the humped portion of the track. One of the rails of the track may be made adjustable by the slot and bolt arrangement shown at 6 to allow changes to be made in the width of the track.

The track is tiltably supported in the upper ends of a pair of spaced standards 7, the spacing between which corresponds to that provided between the cross-members 3. Each standard consists of two spaced plates 8, in the upper ends of which are supported alined longitudinal shafts 9 having sprocket wheels 10 fixed thereto which engage with heavy-duty chains 11 anchored to the bottom faces of the cross-members, as shown particularly well in Figure 4.

To give additional support to the cross-members, rollers 12 may be provided on opposite sides of each sprocket wheel, the rollers being within the flanges 13 of the channel-shaped cross-member.

The plates of the standards 7 rise above the cross-members and are joined by rods 14 which confine the cross-members between the plates of the standard.

When the track is in horizontal position, as shown in Figure 5, it lies substantially centrally over the supporting shafts so that the center of gravity 16 of the load including the motor vehicle 15 is also centrally over the said shafts. The track, in this position, may be slightly unbalanced, however, by off-setting it relative to the supporting shafts or by adding weight on one side, as by supporting legs 17, so that it would normally retain a horizontal position even though the motor vehicle would be somewhat unbalanced the other way. This may be taken care of, however, by positive locking means as hereinafter described.

For tilting the track, any suitable, manually-operated means may be used, as for instance, the handle 18 which extends laterally from one of the rails, as an extension of the transverse member 19.

The principal object of the present invention is to cause the track to climb on its support while it is being tilted so as to keep the center of gravity of the combined weight of the track and the vehicle substantially in vertical alinement with the supporting shafts.

This I accomplish by the lever arrangement shown particularly well in Figures 5 and 6, which comprises an arm 20 fixed to the shaft 9, a link 21 pivoted to the cross-member 3 at a point near the leg support of the track, as at 22, a second link 23 suspended from the arm 20, and a lever 24 having a fixed fulcrum at 25, in brackets extending from the standard plates, and having its ends connected to the free ends of the links 21 and 23.

Due to this arrangement, when the track is tilted from the horizontal position of Figure 5 to the inclined position of Figure 6, the link 21 pulls up on the lever 24 and the latter pulls downward on the arm 20, thereby causing the shaft 9 to turn with the result that the sprocket 10 engaging the chain 11 causes the track to climb toward the ascending side as can be readily seen by a comparison of Figures 5 and 6.

It will be noted that due to this climbing action, the center of gravity 16, at the end of the tilting operation, is still vertically over the supporting shafts, as shown in Figure 6.

The track may be positively locked in any one of a plurality of positions by any suitable means, as, for instance, by a pin 26 passing through registering holes in the lever 24 and a fixed member 27. This locking means may also be used for holding the track in horizontal position.

The vehicle may be suitably anchored to the track by means of chains 28.

To permit the vehicle to drive on the track 1, I provide inclined runways or approaches 29. The runway on the descending side is preferably secured to the track in a loose manner, as by a pin 30 engaging in a lip 31 to keep the runway from interfering with the tilting motion of the track.

In operation, the motor vehicle is first driven on the track and suitably anchored by means of the chains 28. The operator may then apply the handle 18 and by lifting its free end cause the track to tilt and to climb upward on the shafts 9 so that during the entire operation the load remains substantially balanced on its supports.

The operation described, as well as the reverse operation, may be carried out with little effort because the center of gravity of the load does not shift perceptibly.

I claim:

1. In combination, a track for a motor vehicle or the like, spaced cross-pieces connecting the rails of the track, a pair of alined shafts, means for tiltably supporting the cross-pieces on the shafts including a sprocket wheel and coacting means on a cross-piece in engagement therewith, an arm associated with the sprocket, a link pivoted to a cross-member, a second link pivoted to the arm, and a lever having a fixed fulcrum and having its ends connected to the free ends of the links for turning the sprocket wheel when the track is tilted.

2. In combination, a track for a motor vehicle or the like, spaced cross-pieces connecting the rails of the track, a pair of alined shafts, means for tiltably supporting the cross-pieces on the shafts including a sprocket wheel and coacting means on a cross-piece in engagement therewith, an arm associated with the sprocket, a link pivoted to a cross-member, a second link pivoted to the arm, and a lever having a fixed fulcrum and having its ends connected to the free ends of the links for turning the sprocket wheel when the track is tilted, with means for locking the lever in different positions.

3. In combination, a pair of standards, each comprising a pair of spaced plates, alined shafts supported in the standards so as to bridge the plates, sprocket wheels on the shafts, a track having spaced cross-members tiltably disposed over the sprockets and having means coacting with the sprockets for moving the cross-members when the sprockets are turned, means bridging the plates above the cross-members for confining the latter, an arm on one of the sprockets, a link on the corresponding cross-member at a point spaced from the sprocket, a second link on the arm and a lever having a fixed fulcrum and having its ends connected to the free ends of the links for turning the sprocket when the track is tilted whereby the track is moved transversely incident to the tilting movement.

4. In combination, a pair of standards, each comprising a pair of spaced plates, alined shafts supported in the standards so as to bridge the plates, sprocket wheels on the shafts, a track having spaced cross-members tiltably disposed over the sprockets and having means coacting with the sprockets for moving the cross-members when the sprockets are turned, means bridging the plates above the cross-members for confining the latter, an arm on one of the sprockets, a link on the corresponding cross-member at a point spaced from the sprocket, a second link on the arm and a lever having a fixed fulcrum and having its ends connected to the free end of the links for turning the sprocket when the track is tilted whereby the track is moved transversely incident to the tilting movement, the track being slightly over-balanced on the link supporting side of the standards and having legs on that side for normally supporting the track in horizontal position.

5. In combination, a pair of standards, each comprising a pair of spaced plates, alined shafts supported in standards so as to bridge the plates, sprocket wheels on the shafts, a track having spaced cross-members tiltably disposed over the sprockets and having means coacting with the sprockets for moving the cross-members when the sprockets are turned, means bridging the plates above the cross-members for confining the latter, an arm on one of the sprockets, a link on the corresponding cross-member at a point spaced from the sprocket, a second link on the arm and a lever having a fixed fulcrum and having its ends connected to the free ends of the links for turning the sprocket when the track is tilted whereby the track is moved transversely incident to a tilting movement, the track being slightly over-balanced on the link supporting side of the standards and having legs on that side for normally supporting the track in horizontal position and the track having an inclined runway with a pivotal connection between the runway and the track rail on the side opposite the leg supports.

6. In combination, a track for a motor vehicle or the like having spaced cross-pieces connecting the rails of the track, means for supporting the cross-pieces intermediate the ends thereof with freedom of tilting motion, including a wheel having driving connection with one of the cross-pieces for moving the track sidewise when the wheel is turned, and a second driving connection between a point on the cross-piece spaced from the first driving connection and the wheel whereby the latter is turned through an arc corresponding to the tilting movement of the track for moving the track sidewise to maintain the pivotal point of the track substantially in vertical alignment with the center of gravity of the load.

7. In combination, a track for a motor vehicle or the like having spaced cross-pieces connecting the rails of the track, means for supporting the cross-pieces intermediate the ends thereof with freedom of tilting motion, including a wheel having driving connection with one of the cross-pieces for moving the track sidewise when the wheel is turned, and a second driving connection between a point on the cross-piece spaced from the first driving connection and the wheel, whereby the latter is turned for moving the track sidewise when the track is tilted, the second driving connection being made to move the track in an ascending direction a distance corresponding to the pivotal movement of the track for maintaining the pivotal point of the track substantially in vertical alignment with the center of gravity of the load.

8. In combination, a track for a motor vehicle or the like, spaced cross-pieces connecting the rails of the track, means for tiltably supporting the cross-pieces including a sprocket wheel and cooperative means on a cross-member in engagement therewith, a link secured upon the cross-member at a point spaced from the middle thereof, and means operable by the link upon a tilting movement of the track for turning the sprocket wheel to move the track sidewise in an upward direction a distance corresponding to the pivotal movement of the track for maintaining the pivotal point of the track substantially in vertical alignment with the center of gravity of the load.

9. In combination, a track for a motor vehicle or the like, spaced cross-pieces connecting the rails of the track, means for tiltably supporting the cross-pieces, including a sprocket wheel and cooperative means on a cross-member in engagement therewith, a link secured upon the cross-member at a point spaced from the middle thereof, a lever operable by the link, and means operable by the lever for turning the sprocket wheel when the track is tilted, for moving the track sidewise a distance corresponding to the tilting movement of the track and maintaining the pivotal point of the track substantially in vertical alignment with the center of gravity of the load.

CARL W. STORY.

REFERENCES CITED

The following references are of record in the file of this patent:

UNITED STATES PATENTS

| Number | Name | Date |
|---|---|---|
| 1,266,094 | Beckman | May 14, 1918 |
| 1,500,284 | Stubbs | July 8, 1924 |